United States Patent
Pardo

(10) Patent No.: US 7,141,450 B2
(45) Date of Patent: Nov. 28, 2006

(54) FLIP-CHIP ALIGNMENT METHOD

(75) Inventor: Flavio Pardo, New Providence, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 144 days.

(21) Appl. No.: 10/118,177

(22) Filed: Apr. 8, 2002

(65) Prior Publication Data

US 2003/0189705 A1  Oct. 9, 2003

(51) Int. Cl.
*H01L 21/50* (2006.01)

(52) U.S. Cl. .................. 438/108; 438/107; 438/975

(58) Field of Classification Search ........... 438/108, 438/107, 401, 462, 975
See application file for complete search history.

(56) References Cited

U.S. PATENT DOCUMENTS

| | | | |
|---|---|---|---|
| 3,742,229 A * | 6/1973 | Smith et al. ............... 378/34 |
| 3,903,363 A * | 9/1975 | Montone et al. ........... 348/87 |
| 5,611,008 A * | 3/1997 | Yap ......................... 385/14 |
| 5,770,889 A * | 6/1998 | Rostoker et al. ........... 257/698 |
| 5,805,421 A * | 9/1998 | Livengood et al. ......... 361/736 |
| 6,211,935 B1 * | 4/2001 | Yamada .................... 349/149 |
| 6,278,193 B1 * | 8/2001 | Coico et al. ............... 257/797 |
| 6,432,744 B1 * | 8/2002 | Amador et al. ............ 438/108 |
| 6,531,767 B1 * | 3/2003 | Shrauger .................. 257/678 |
| 2003/0094707 A1* | 5/2003 | Howarth .................... 257/797 |

* cited by examiner

*Primary Examiner*—Michael Trinh
(74) *Attorney, Agent, or Firm*—Eugene J. Rosenthal

(57) ABSTRACT

Flip-chips are aligned by making a fiducial in the "top" chip that is translucent/transparent to light of a wavelength shorter than infrared, and at least one corresponding fiducial in the "bottom" chip. The top-chip fiducial may be made of a transparent or translucent material, its shape may be outlined by an opaque material, or it may be formed by etching through the top chip. The bottom-chip fiducial may be reflective of the light which is transparent/translucent to the fiducial in the top chip, in which case alignment can be achieved by employing at least one video camera which is located above the top chip. Alternatively, the fiducial in the bottom chip may also be transparent/translucent to the light, in which case alignment can be achieved by having the video camera located below the bottom chip. The chips are aligned by aligning the fiducials as seen by the video camera.

9 Claims, 4 Drawing Sheets

FLIP-CHIP ALIGNMENT METHOD

TECHNICAL FIELD

This invention relates to the art of flip-chips, which are two separate chips bonded together, and more particularly, to a method for achieving a high precision alignment of the chips which will make up the flip-chip.

BACKGROUND OF THE INVENTION

Prior art methods for performing the prior-to-bonding alignment of the chips which will make up the flip-chip are adequate for chips that only contain electronic circuits, because it is necessary to align the electrical contact pads of each chip with merely sufficient accuracy that an electrical connection can be made. One prior art alignment method involves inserting a visible wavelength sensitive bi-directional video camera between the two chips to be bonded, the bi-directional video camera being a video camera which can look up and down simultaneously through the use of appropriately placed prisms, and aligning opaque-to-visible-light fiducials in the chips to be bonded as seen by the bi-directional video camera. Another prior art alignment method takes advantage of the fact that silicon is transparent to infrared light. This method uses video camera that can see infrared light to look though both chips and align fiducials which are specially made on the chips to be opaque to infrared light while at least their surrounding area is transparent to infrared light.

Neither of the foregoing prior art methods can achieve the high precision required for making flip-chips that contain optical devices such as micro-electromechanical systems (MEMS) devices. The precision required for a MEMS flip-chip is considerably higher than for an flip-chip that contains only electrical devices because the alignment tolerance required for a MEMS flip-chip is much less than the size of an electrical contact pad. The former prior art method is unable to achieve such high precision because the chips can only be aligned when they are far apart enough to insert the bi-directional, sensitive-to-visible-light, video camera, and thereafter, as the chips are then moved toward each other for bonding they may become misaligned again. The latter prior art method is limited by the resolution of the infrared video camera, which is on the order of the alignment precision desired, e.g., several microns. Also, it restricts the types of materials that can be employed to those which ensure that the fiducials can be seen using infrared light.

SUMMARY OF THE INVENTION

I have recognized that a higher degree of precision for the alignment and bonding of flip-chips can be achieved by making in a first chip, which is referred to herein for convenience as the "top" chip, at least one fiducial that is translucent/transparent to light of a wavelength that is shorter than infrared light, e.g., in the visible wavelengths and shorter, and at least one corresponding fiducial in the second chip, which is referred to herein for convenience as the "bottom" chip. The at least one translucent/transparent fiducial of the top chip may be made of a material that is transparent to light of a wavelength shorter than the wavelength of infrared light, it may be formed of a material translucent/transparent to light of a wavelength shorter than the wavelength of infrared light, the shape of the fiducial may be outlined by a material opaque to light of a wavelength shorter than the wavelength of infrared light, or the fiducial may be formed by etching through the entire first chip, i.e., it is a specially shaped hole through the first chip. The at least one fiducial in the bottom chip may be reflective of the light which is transparent/translucent to the fiducial in the top chip, in which case alignment can be achieved by employing at least one video camera which is located above the top chip which sees the wavelength of light transparent to the fiducial in the top chip. Alternatively, the at least one fiducial in the bottom chip may also be transparent/translucent to the light which is transparent/translucent to the fiducial in the top chip, in which case alignment can be achieved by employing at least one video camera which is located below the bottom chip and sees the wavelength of light transparent to the fiducials of the top and bottom chip which are to be aligned. The chips are aligned by aligning the fiducials as seen by the video camera. When multiple fiducials are employed in each chip, a single video camera may be moved from fiducial location to fiducial location, or multiple video cameras, e.g., one for each fiducial location, may be employed. Advantageously, the alignment process may be completed while the chips are much closer to each other than in the prior art methods, so that when the chips are moved together after the alignment process has been completed they do not have the opportunity to become substantially out of alignment.

In one embodiment of the invention, the prior art method of inserting a visible wavelength video bi-directional camera may be employed to achieve an initial coarse alignment. Moreover, the translucent/transparent fiducial of the top chip, which allows light to pass all the way through the top chip, provides much greater contrast than the prior art opaque-to-visible-light fiducials that had been used. Thus, even the coarse alignment achieved by the prior art is, advantageously, improved using the transparent/translucent fiducial of the invention, and this can even be further improved by shining a light through the inventive fiducial during the coarse alignment process. Thereafter, the two chips are brought closer to each other so that they are separated by a minimal distance in a manner such that only the tallest features of both chips do not touch. The fiducials of the invention are then aligned in accordance with the invention, and thereafter, the chips brought finally together by closing the minimal distance which had remained between them.

DETAILED DESCRIPTION

Figure 1:
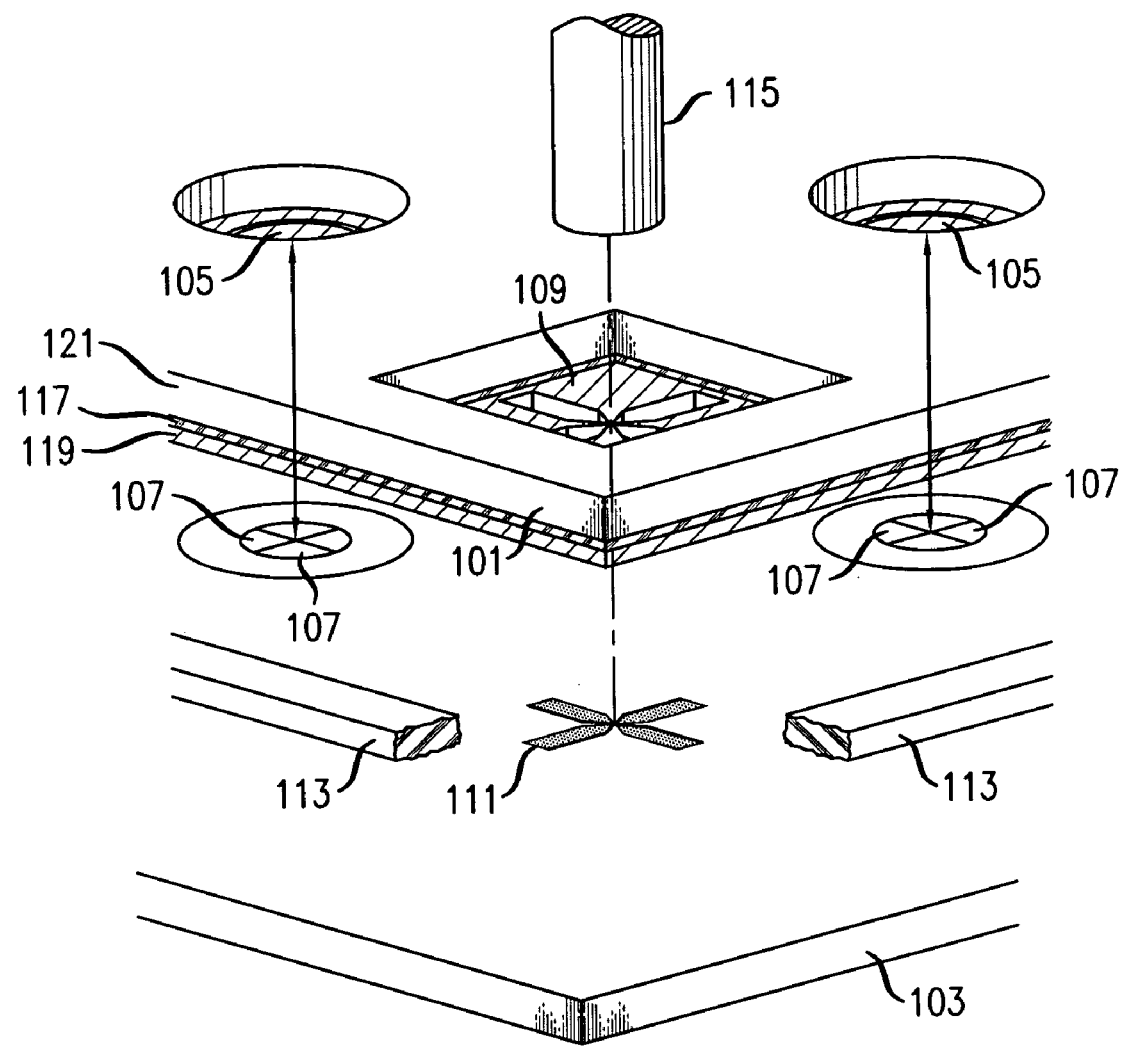
FIG. 1 shows a three-dimensional view of two exemplary chips which may be precisely aligned in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Unless otherwise explicitly specified herein, the drawings are not drawn to scale.

Additionally, unless otherwise explicitly specified herein, any lens shown and/or described herein is actually an optical system having the particular specified properties of that lens. Such an optical system may be implemented by a single lens element but is not necessarily limited thereto. Similarly, where a mirror is shown and/or described what is actually being shown and/or described is an optical system with the specified properties of such a mirror, which may be implemented by a single mirror element but is not necessarily limited to a single mirror element. This is because, as is well known in the art, various optical systems may provide the same functionality of a single lens element or mirror but in a superior way, e.g., with less distortion. Furthermore, as is well known in the art, the functionality of a curved mirror may be realized via a combination of lenses and mirrors and vice versa. Moreover, any arrangement of optical components that are performing a specified function, e.g., an imaging system, gratings, coated elements, and prisms, may be replaced by any other arrangement of optical components that perform the same specified function. Thus, unless otherwise explicitly specified here, all optical elements or systems that are capable of providing specific function within an overall embodiment disclosed herein are equivalent to one another for purposes of the present disclosure.

The term micro-electromechanical systems (MEMS) device as used herein is intended to mean an entire MEMS device or any portion thereof. Thus, if a portion of a MEMS device is inoperative, or if a portion of a MEMS device is occluded, such a MEMS device is nonetheless considered to be a MEMS device for purposes of the present disclosure.

In the description, identically numbered components within different ones of the FIGS. refer to the same components.

A higher degree of precision for the alignment and bonding of flip-chips can be achieved by making a) in a first chip, which is referred to herein for convenience as the "top" chip, at least one fiducial that is transparent/translucent to light of a selected wavelength that is shorter than the wavelength of infrared light and will pass through the fiducial sufficiently to be seen through the fiducial, and b) at least one corresponding fiducial in the second chip, which is referred to herein for convenience as the "bottom" chip. The fiducial in the bottom chip may be opaque or transparent/translucent to the wavelength of light used, depending on the placement of the camera by which the fiducials are viewed.

FIG. 1 shows a three-dimensional view of two exemplary chips 101 and 103 which may be precisely aligned in accordance with the principles of the invention to form an exemplary optical MEMS device. More specifically, chip 101 contains the various mirrors 105 necessary for the optical MEMS device and chip 103 contains control electrodes 107 and the associated wiring therefore, the wiring not being shown in FIG. 1 for clarity purposes. When chip 101 is aligned and bonded to chip 103, mirrors 105 of chip 101 may be rotated using electrical signals which are presented at various ones of electrodes 107 of chip 103.

In order for the maximum angular tilt range of mirrors 105 to be achieved, and to avoid causing any electrical short circuits when a mirror is tilted, it is necessary that mirrors 105 be precisely located over their associated electrodes. To this end, in accordance with the principles of the invention, chip 101 has formed therein exemplary fiducial 109, which is at least translucent, if not transparent, to light of a wavelength that is shorter than the tolerance distance of the alignment required and at least shorter than the wavelength of infrared light.

One exemplary method for making fiducial 109 is particularly suitable when chip 101 is a silicon on insulator (SOI) type of chip. In FIG. 1, chip 101 is an exemplary 501 chip made of three layers. The first layer is handle wafer layer 121, which is silicon. The second layer, buried oxide layer (BOX) 11 7, which is also known as the "sacrificial layer"; is an insulator. The third layer, mechanical layer 119, is also silicon, although it a) is typically much thinner than handle wafer layer 121 and b) may be referred to as the device layer.

In order to make fiducial 109 with the necessary precision for aligning chips 101 and 103, the pattern of fiducial 109 is etched into mechanical layer 119, so that holes in the shape of fiducial 109 reveals BOX 117 in the same shape. Thereafter, an opening sufficient to cover fiducial 109 is etched into handle wafer layer 121, revealing BOX 117. BOX 117 is then etched, e.g., through the opening in handle wafer layer 121, thus leaving holes all the way through chip 101 in the desired shape of fiducial 109. The order of etching of the silicon layers may be reversed, and, as will be appreciated by those of ordinary skill in the art, appropriate masking must be performed so that only those areas desired to be etched are actually etched. Note that the steps of making the fiducial may be concurrently performed with the steps for forming the mechanical devices such as micro mirrors 105.

Figure 6:
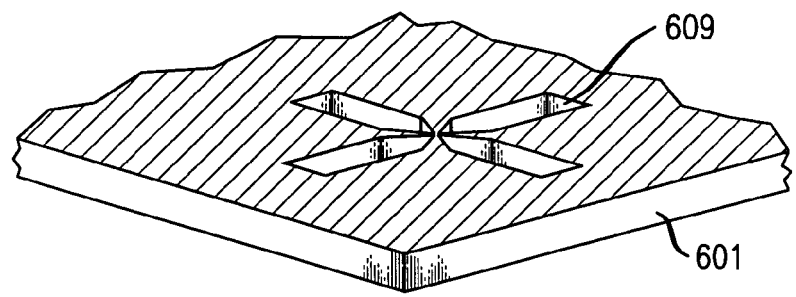
FIG. 6 shows an exemplary fiducial formed by etching straight though a top chip.

In another exemplary embodiment, when top chip 101 is silicon and an alignment tolerance of one micron or less is desired, the fiducial is made by etching its shape all the way through top chip 101. This may only be achieved if there is an etchant that yields the necessary precision of the resulting etch lines. FIG. 6 shows exemplary fiducial 609 formed by etching straight though chip 601.

Figure 7:
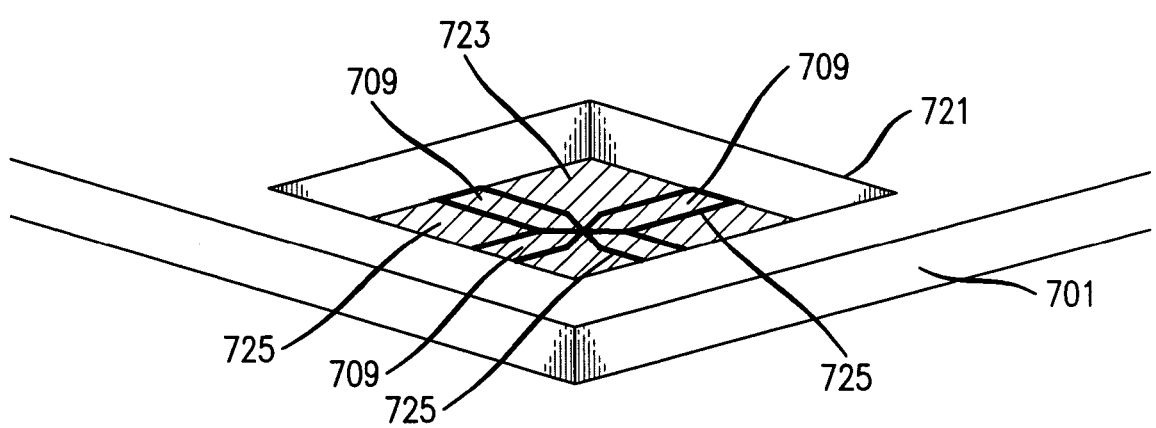
FIG. 7 shows a fiducial formed on a top chip that is very thin so that it is translucent to a selected wavelength of light, and it is shaped by having its outline formed using a material that is opaque to the selected wavelength of light.

Alternatively, the fiducial may be formed on a part of chip 101 that is very thin, so that it is translucent to the selected wavelength of light. One way that this may be achieved is by partial etching of that part of the chip. The fiducial may be further shaped by having its outline formed using a material that is opaque to the selected wavelength of light. Thus, if the silicon window is on the order of 3 microns or less in thickness, the selected wavelength may be in the visible region and the opaque material which outlines the fiducial may be 0.5 micron thick aluminum. This is shown in FIG. 7, where silicon chip 701 has had opening 721 etched into it so that the resulting remaining window of thin silicon 723 is translucent. Translucent fiducial 709 is revealed by being outlined by aluminum outline 725. Although aluminum outline 725 may be placed on either side of transparent fiducial 709, it is easier to do so from the side opposite to opening 721 given the present state of technology.

Note that although a fiducial may have several parts it is still considered only one fiducial. Further note that any shape desired by the implementer may be used for the fiducial.

Returning to FIG. 1, fiducial 111 is made in chip 103 in a manner such that it corresponds to fiducial 109 of chip 101, in accordance with the principles of the invention. The shape of fiducial 111 may be any shape desired by the implementer provided that the chosen shape allows alignment to be performed in combination with fiducial 109. Fiducial 111 may be reflective of the light which is transparent to fiducial 109 or it may be opaque thereto, depending on the particular implementation desired by the implementer, as will be explained more fully hereinbelow.

FIG. 1 also shows spacer wall 113 of chip 103. The top of spacer wall 113 is the highest point on chip 103, and it is to the top of spacer wall 113 that chip 101 will be attached.

In accordance with the principles of the invention, fiducials of flip-chips are aligned using a video camera. In the exemplary embodiment of FIG. 1, chips 101 and 103 are aligned by aligning fiducials 109 and 111 as seen by video camera 115. Video camera 115 is capable of detecting, i.e., "seeing", the wavelength of light transparent to fiducial 109. Given that video camera 115 is likely to be a high magnification video camera, it should be able to operate properly at the distance between the camera location and the face of chip 103 that is facing chip 101. This distance will be at least the depth of chip 101 and the space between chip 101 and 103 during alignment, and may be greater than that, e.g., if a glass chuck is used to hold chip 101 from the face that is away from chip 103 during alignment, i.e., the "back" of chip 101. Video camera 115 should also have a depth of focus that is larger than spacer 113 is tall, and it should be capable of capturing an image of a sufficient section of fiducial 109 that will enable alignment to be achieved. Of course, if coaxial illumination is employed for video camera 115, the wavelength of the coaxial illumination of video camera 115 must be at least in the range of the wavelength of light that is translucent/transparent to fiducial 109.

Figure 2:
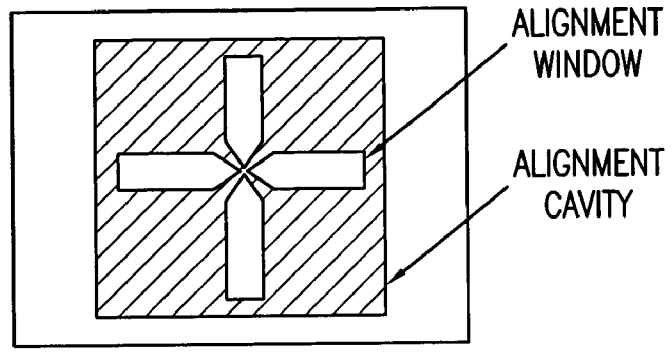
FIG. 2 shows the pattern the video camera of FIG. 1 would see looking from the top of the fiducial in the top chip of FIG. 1 toward the fiducial in the bottom chip of FIG. 1.
Figure 3:
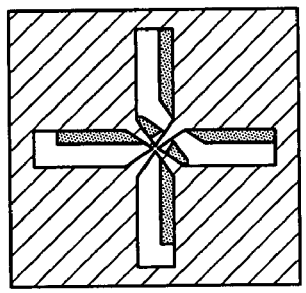
FIG. 3 shows an image after an exemplary coarse alignment.
Figure 4:
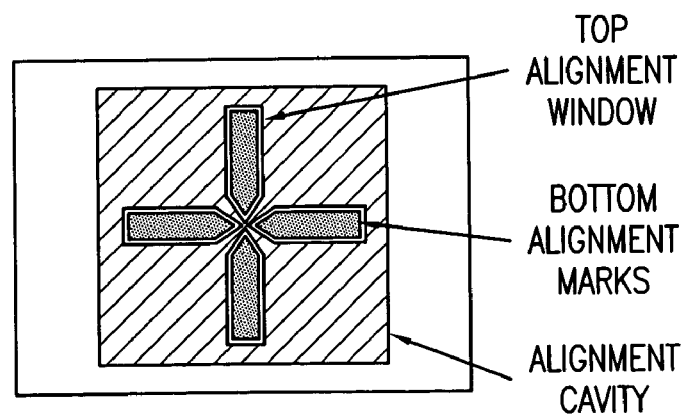
FIG. 4 shows an exemplary aligned condition.

Fiducial 111 in chip 103 may be reflective of the light which is translucent/transparent to the fiducials in top chip 101. Such an embodiment of the invention employs the coaxial illumination of video camera 115. Video camera 115 looking from the top of chip 101 at fiducial 109 by itself would see the pattern shown in FIG. 2. After coarse alignment, fiducial 111 should at least be partially seen by video camera 115 through the transparent portion of fiducial 109, with an exemplary such image being shown in FIG. 3. The operator may then bring chips 101 and 103 together so that they are separated by a minimal distance in a manner such that only the tallest features of both chips do not touch. Thereafter fiducials 109 and 111 are precisely aligned, e.g., so that all of fiducial 111 is visible within fiducial 109, and all of the corresponding features are aligned and parallel. The gaps between the fiducials are indicative of the degree of alignment accuracy which is achievable. The aligned condition is shown in FIG. 4.

Chips 101 and 103 are then moved toward each other until they are brought into full contact and bonded.

Figure 5:
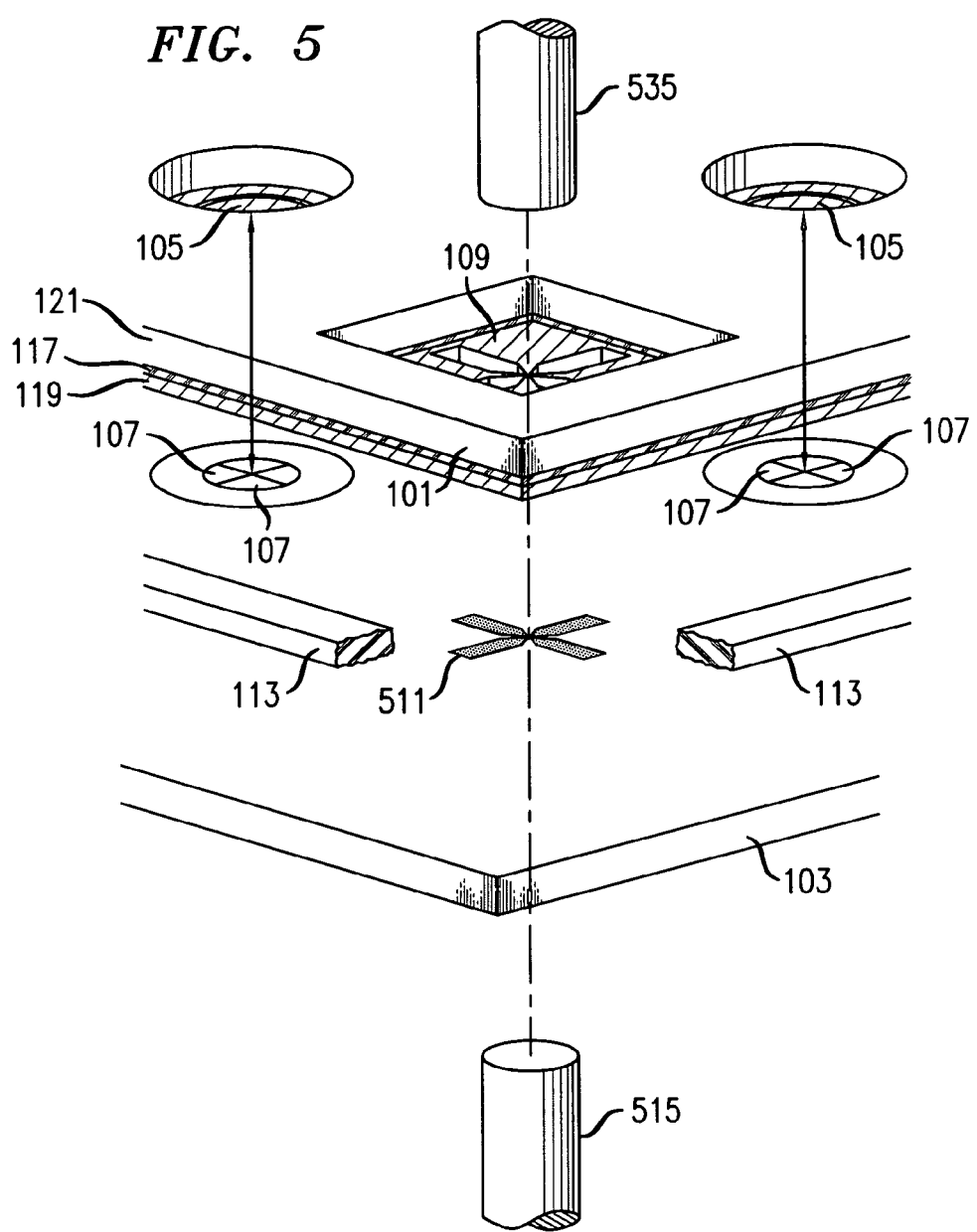
FIG. 5 shows an alternative embodiment of the invention.

In an alternative embodiment of the invention, shown in FIG. 5, fiducial 511 in chip 103 is also transparent/translucent to the light which is transparent/translucent to fiducial 109 of chip 101, in which case alignment can be achieved by employing at least one video camera 515 located below chip 103 which sees the wavelength of light transparent/translucent to all of the fiducials which is supplied by light source 535. The chips are aligned by aligning the fiducials seen by video camera 515.

When multiple fiducials are employed in each chip, a single video camera may be moved from the location of one fiducial to the location of another fiducial, or multiple video cameras, e.g., one for each fiducial location, may be employed, so that alignment may be performed at multiple locations to improve the overall alignment.

Advantageously, the precision alignment process may be completed while the chips are much closer to each other than in the prior art methods, so that when the chips are finally moved together after the precision alignment process has been completed the distance through which the chips need to move is relatively small and so chips do not have the opportunity to become substantially out of alignment.

In one embodiment of the invention, the prior art method of inserting a visible wavelength bi-directional video camera may be employed to achieve an initial coarse alignment. Moreover, the translucent/transparent fiducial of the top chip, which allows light to pass all the way through the top chip, provides much greater contrast than the prior art features which were used. Thus, even the coarse alignment achieved by the prior art is, advantageously, improved using the transparent/translucent fiducial of the invention, and this can even be further improved by shining a light through the inventive fiducial during the coarse alignment process. Thereafter, the two chips are brought closer to each other so that they are separated by a minimal distance in a manner such that only the tallest features of both chips do not touch. The fiducials of the invention are then aligned in accordance with the principles of the invention as described hereinabove, and thereafter, the chips are finally brought together by closing the minimal distance which had remained between them.

The alignment process may be performed manually or through the use of an image recognition system.

What is claimed is:

1. A method for aligning two chips to form a microelectromechanical systems (MEMS) flip-chip comprising the step of:
    forming at least one fiducial mark in a first chip that is one of the set consisting of transparent and translucent to a wavelength of light shorter than infrared light, said first fiducial mark not being at the edge of said first chip;
    forming at least one fiducial mark in a second chip, said at least one fiducial mark in said second chip not being at the edge of said second chip and being one of the set consisting of transparent and translucent to said wavelength of light; and precisely aligning said at least one fiducial mark in said first chip with said at least one fiducial mark in said second chip using a video camera that sees light of said wavelength that has passed through said at least one fiducial mark in said first chip and said at least one fiducial mark in said second chip so as to precisely align said first and second chips to a precision of one micron or less when forming said MEMS flip-chip.

2. The invention as defined in claim 1 further comprising the step of performing a coarse alignment of said first and second chips prior to said step of precisely aligning.

3. The invention as defined in claim 1 further comprising the step of performing a coarse alignment of said first and second chips prior to said step of precisely aligning, said step of coarse alignment employing said fiducial marks while said first and second chips are separated by substantially more than a minimal distance at which that only a tallest feature of said first and second chips does not touch its opposite chip.

4. The invention as defined in claim 1 further comprising the step of bringing said first and second chip proximate to each other so that they are separated by only a minimal distance at which only a tallest feature of said first and second chips does not touch its opposite chip prior to said step of precisely aligning.

5. The invention as defined in claim 1 further comprising the step bringing said first and second chip into pitch and roll alignment prior to said step of precisely aligning.

6. The invention as defined in claim 1 wherein said forming step further comprises the step of etching at least a portion of said first chip at the location of said at least one fiducial mark to reduce the thickness of said portion.

7. The invention as defined in claim 1 wherein said forming step further comprises the step of etching through said first chip at the location of said at least one fiducial mark.

8. The invention as defined in claim 1 wherein said forming step further comprises the steps of:
   etching said first chip at the location of said at least one fiducial mark to produce a translucent area; and
   outlining said fiducial mark within said translucent area with a border of material that is opaque to said wavelength of light.

9. A method for aligning two chips to form a microelectromechanical systems (MEMS) flip-chip comprising the steps of:
   forming at least one fiducial mark in a first chip having first and second opposite sides, said first fiducial mark not being at an edge of said first chip and being at least sufficiently translucent so that it can be seen by a video camera should sufficient light of a selected wavelength of light that is shorter than infrared be passed from said first side of said first chip through said first fiducial mark to said video camera if said video camera were to be located on said second side of said first chip, said video camera being able to see said selected wavelength;
   forming at least one fiducial mark in a second chip not at an edge thereof, said second chip having first and second opposite sides, said second fiducial mark being one of the set consisting of transparent and translucent to said wavelength of light; and
   precisely aligning said at least one fiducial mark in said first chip with said at least one fiducial mark in said second chip on an image generated using light of said selected wavelength that has passed through said at least one fiducial mark in said first chip and said at least one fiducial mark in said second chip and thereafter entered said video camera so as to precisely align said first and second chips to a precision of one micron or less when forming said MEMS flip-chip.

* * * * *